US011752465B2

(12) United States Patent
Schubert

(10) Patent No.: US 11,752,465 B2
(45) Date of Patent: Sep. 12, 2023

(54) WET SCRUBBER APPARATUS

(71) Applicant: Schubert Environmental Equipment, Inc., Glendale Heights, IL (US)

(72) Inventor: John Schubert, Geneva, IL (US)

(73) Assignee: Schubert Environmental Equipment, Inc., Glendale Heights, IL (US)

(*) Notice: Subject to any disclaimer, the term of this patent is extended or adjusted under 35 U.S.C. 154(b) by 898 days.

(21) Appl. No.: 15/346,961

(22) Filed: Nov. 9, 2016

(65) Prior Publication Data

US 2018/0126318 A1   May 10, 2018

(51) Int. Cl.
| | | |
|---|---|---|
| *B01D 47/00* | (2006.01) |
| *B01D 53/14* | (2006.01) |
| *B01D 50/40* | (2022.01) |
| *B01D 47/12* | (2006.01) |
| *B01D 45/08* | (2006.01) |
| *B01D 47/02* | (2006.01) |
| *B01D 47/06* | (2006.01) |

(52) U.S. Cl.
CPC ............ *B01D 50/40* (2022.01); *B01D 45/08* (2013.01); *B01D 47/027* (2013.01); *B01D 47/06* (2013.01); *B01D 47/12* (2013.01); *B01D 2247/105* (2013.01); *B01D 2247/14* (2013.01)

(58) Field of Classification Search
None
See application file for complete search history.

(56) References Cited

U.S. PATENT DOCUMENTS

| | | | | |
|---|---|---|---|---|
| 877,460 | A | * | 1/1908 | Brunner et al. ....... B01D 45/08 122/491 |
| 1,989,774 | A | * | 2/1935 | Snow ..................... B01D 45/10 261/111 |
| 2,051,545 | A | * | 8/1936 | Collins ................... B01D 3/18 196/46 |
| 3,683,594 | A | | 8/1972 | Schouw |
| 3,685,261 | A | * | 8/1972 | McIlvaine ........... B01D 47/025 261/DIG. 54 |
| 3,699,748 | A | * | 10/1972 | Barkovitz ............. B01D 47/06 261/109 |

(Continued)

FOREIGN PATENT DOCUMENTS

NL           2012844 B1     2/2016

*Primary Examiner* — Christopher P Jones
*Assistant Examiner* — Phillip Y Shao
(74) *Attorney, Agent, or Firm* — Erickson Law Group, PC

(57) ABSTRACT

A wet scrubber apparatus has a housing with access doors and guides that allow for the installation of self-contained baffle modules. Selected baffle modules can to be inserted, exchanged, removed or left blank (no baffles) within the wet scrubber housing, depending on the desired process. The wet scrubber allows for variable performance and feature-enhancing for a target efficiency and effectiveness. The wet scrubber can incorporate a pump and pipe manifold "fluidizer" design that can spray water or fluid up onto the modules during operation of the wet scrubber to keep collected material off the baffles. Water can be sprayed throughout the modules onto the baffles during operation, or when the scrubber is offline, isolated from the gas to be scrubbed, during a cleaning operation. This water or fluid can come from an outside source or can be piped and valved to recirculate existing scrub water or fluid.

16 Claims, 9 Drawing Sheets

(56) References Cited

U.S. PATENT DOCUMENTS

| | | | | |
|---|---|---|---|---|
| 3,702,527 | A * | 11/1972 | Frew | B01D 45/08 55/440 |
| 3,795,089 | A * | 3/1974 | Reither | B01D 47/06 261/116 |
| 3,957,464 | A * | 5/1976 | Teller | B01D 47/12 95/196 |
| 3,971,641 | A | 7/1976 | McNamara | |
| 4,204,847 | A * | 5/1980 | Ko | B01D 45/08 55/440 |
| 4,253,854 | A * | 3/1981 | James | B01D 46/10 261/100 |
| 4,290,783 | A * | 9/1981 | Adams | B01D 46/10 95/196 |
| 4,732,585 | A * | 3/1988 | Lerner | B01D 45/08 165/159 |
| 4,784,674 | A * | 11/1988 | Sarmiento | B01D 45/04 55/440 |
| 4,888,158 | A * | 12/1989 | Downs | B01D 45/08 423/243.04 |
| 4,952,221 | A | 8/1990 | Morika | |
| 4,955,990 | A * | 9/1990 | Napadow | B01D 45/08 95/216 |
| 5,486,341 | A * | 1/1996 | Bresowar | B01D 45/08 423/242.1 |
| 6,032,932 | A | 3/2000 | Sixsmith | |
| 6,059,866 | A * | 5/2000 | Yamagata | B01D 45/08 96/251 |
| 6,863,716 | B2 * | 3/2005 | Chen | B01D 47/06 96/297 |
| 7,004,998 | B2 * | 2/2006 | Scherrer | B01D 19/0042 55/443 |
| 7,585,345 | B2 * | 9/2009 | Smasal | B01D 45/08 55/443 |
| 7,931,721 | B2 * | 4/2011 | Kanka | B01D 45/08 55/418 |
| 8,066,804 | B2 | 11/2011 | Gjertsen et al. | |
| 8,236,249 | B2 * | 8/2012 | Doring | B01D 45/02 422/170 |
| 8,404,023 | B1 | 3/2013 | Osborne et al. | |
| 9,388,688 | B2 | 7/2016 | Both | |
| 2004/0139858 | A1 * | 7/2004 | Entezarian | B01D 46/30 95/275 |
| 2008/0210095 | A1 | 9/2008 | Crews et al. | |
| 2012/0097031 | A1 | 4/2012 | McClelland | |
| 2014/0020562 | A1 * | 1/2014 | Both | B01D 46/003 96/297 |
| 2015/0085600 | A1 * | 3/2015 | Van Duijn | B01D 3/24 366/144 |
| 2015/0135661 | A1 * | 5/2015 | MacDonald | F24F 13/082 55/440 |
| 2016/0220941 | A1 | 8/2016 | Banh | |

\* cited by examiner

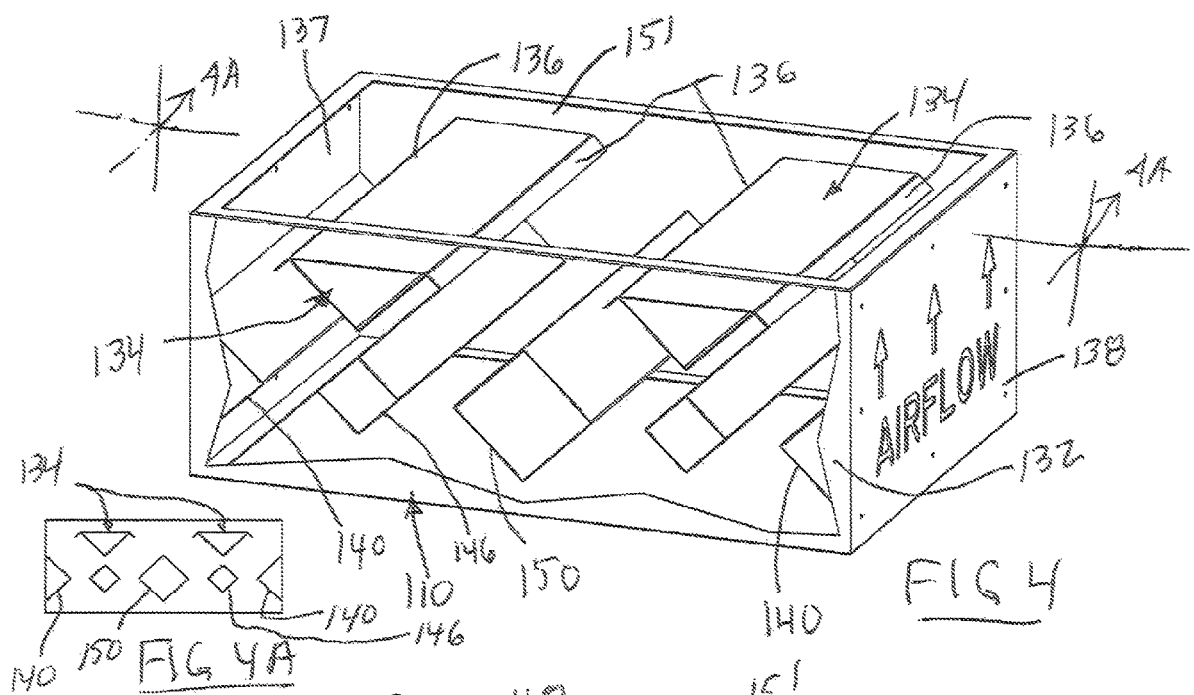
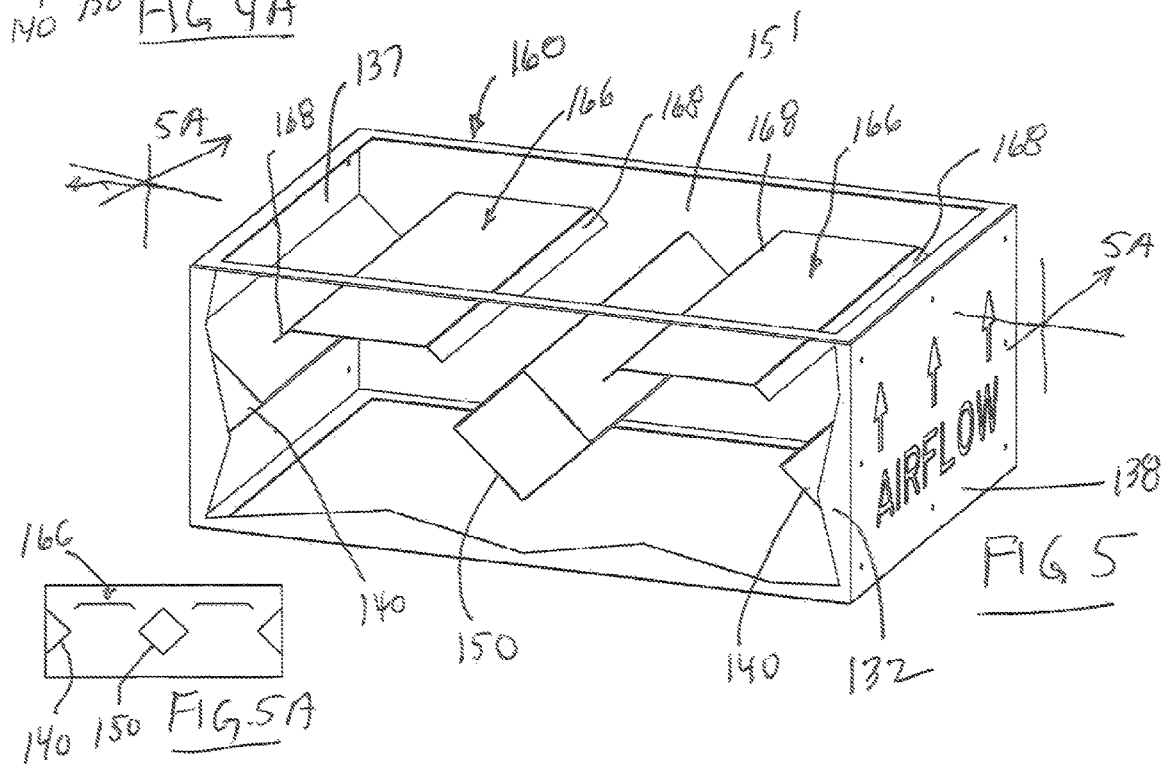

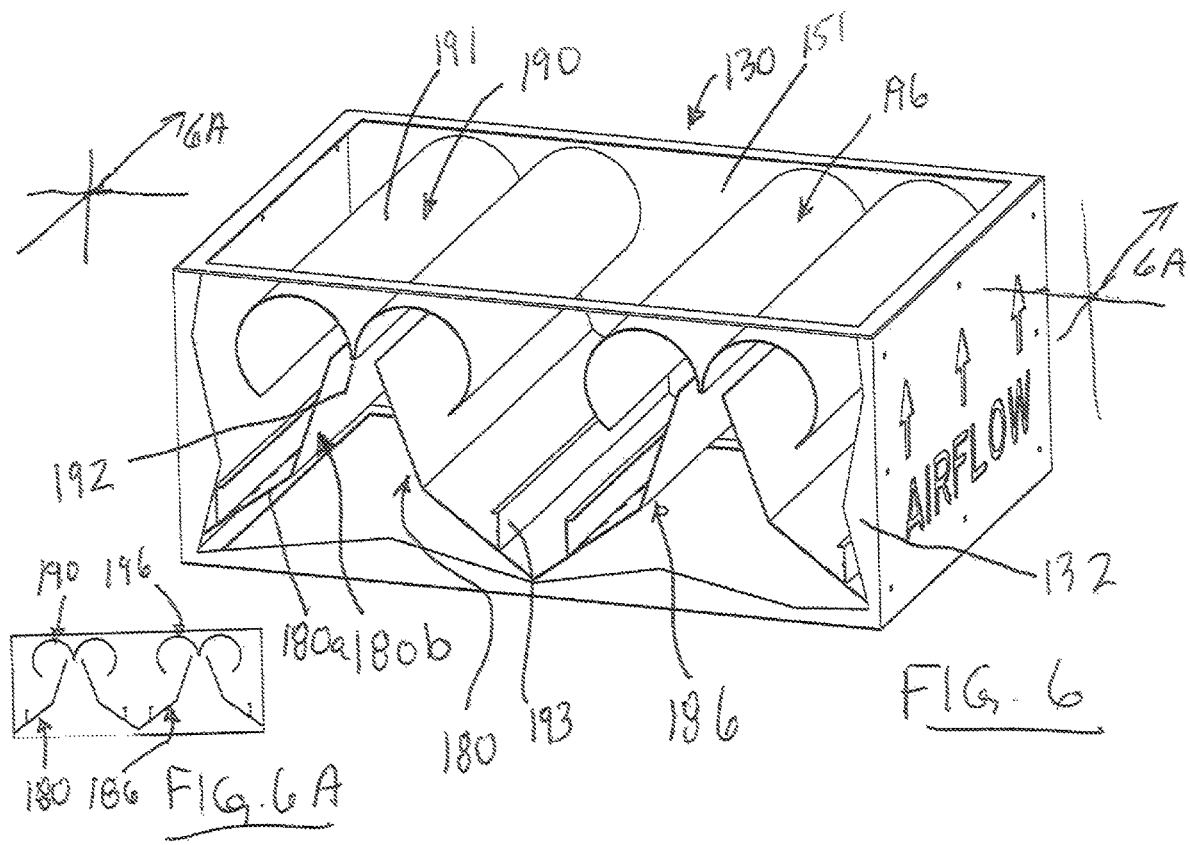

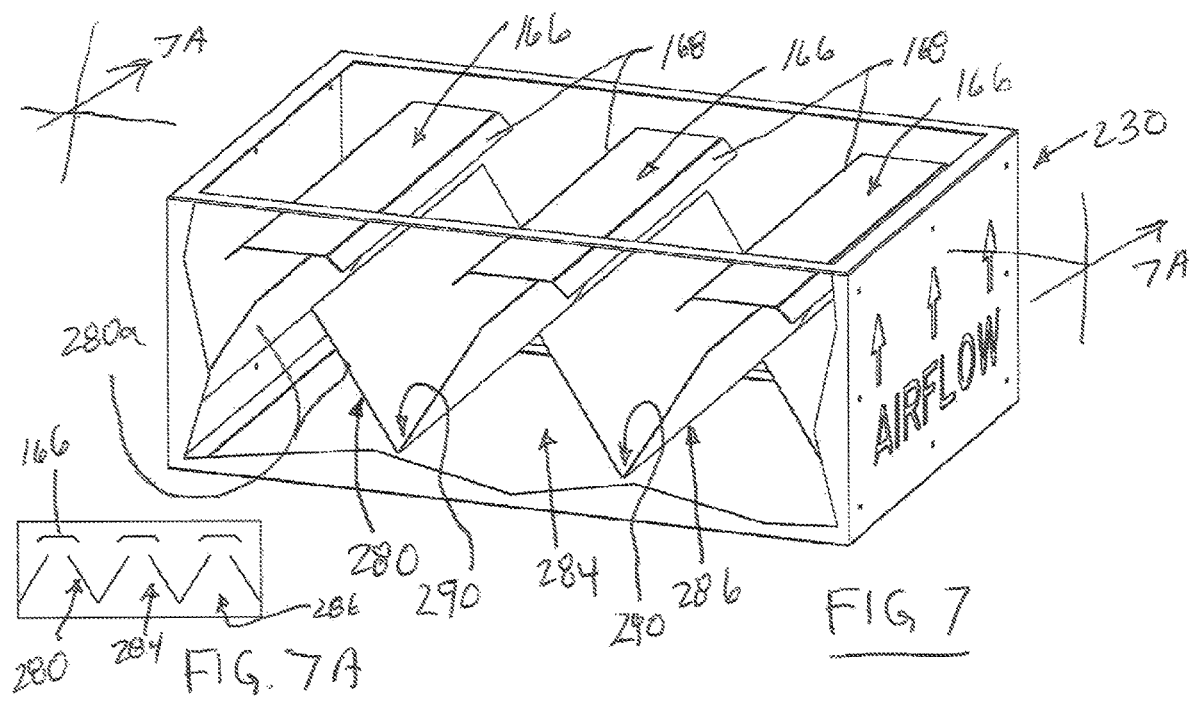
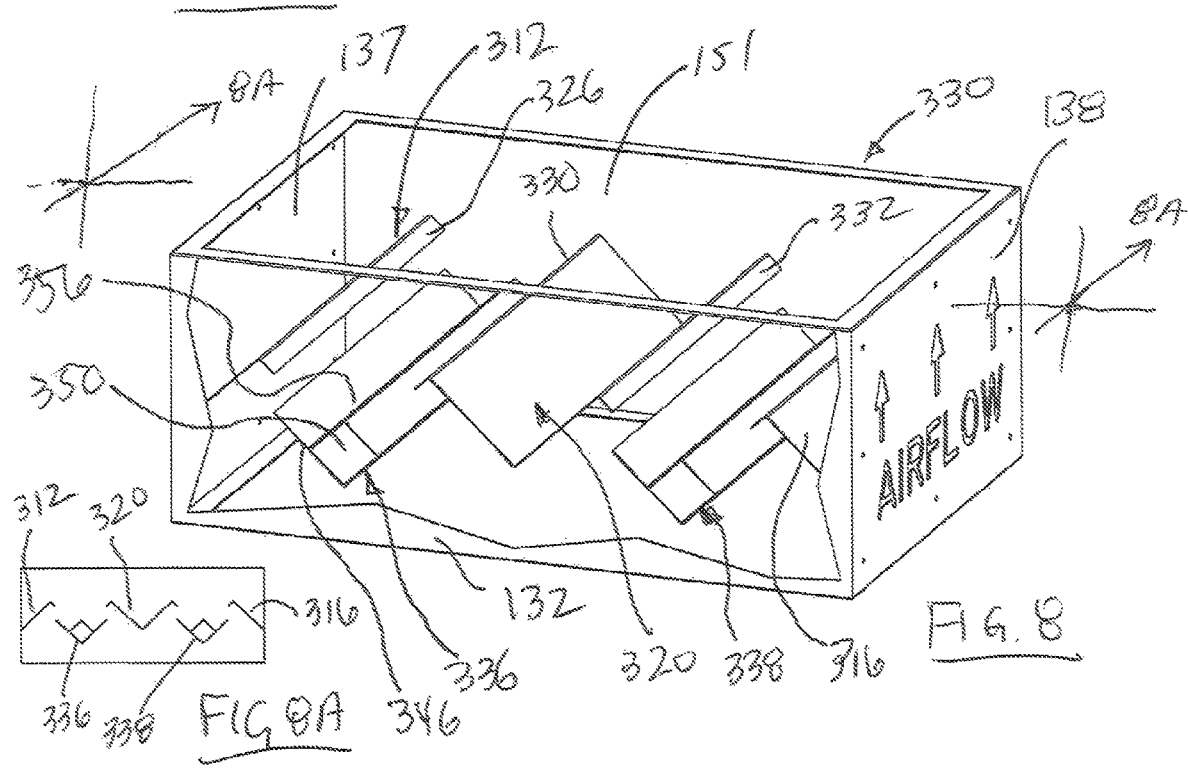

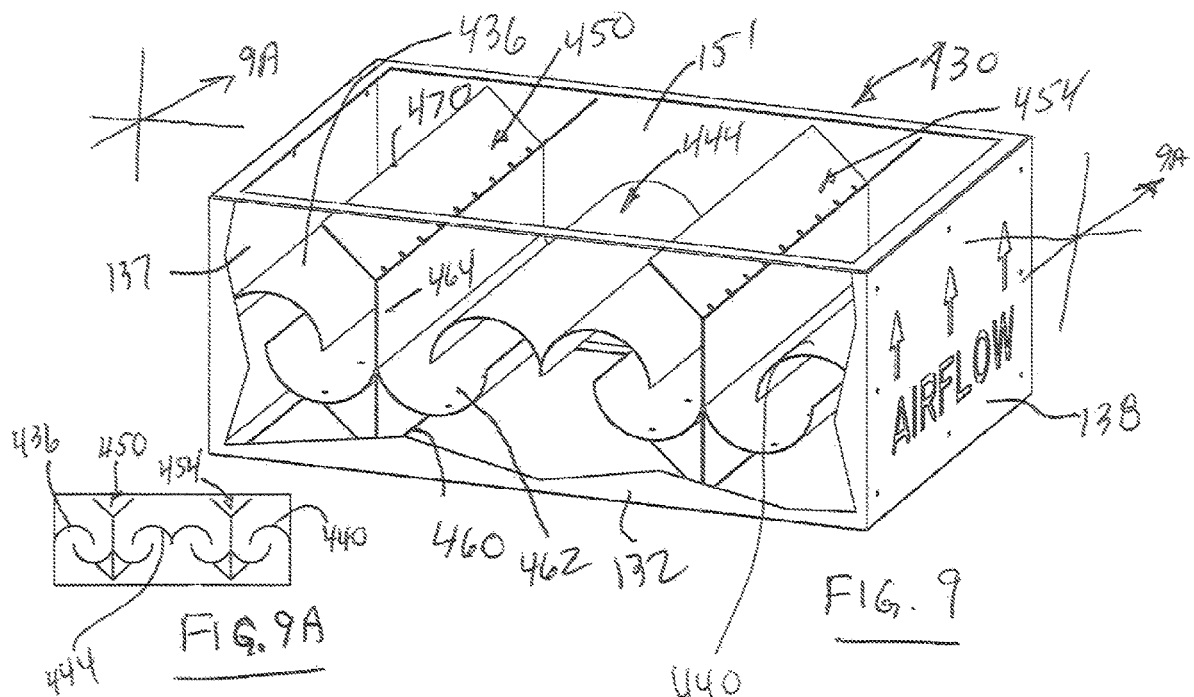
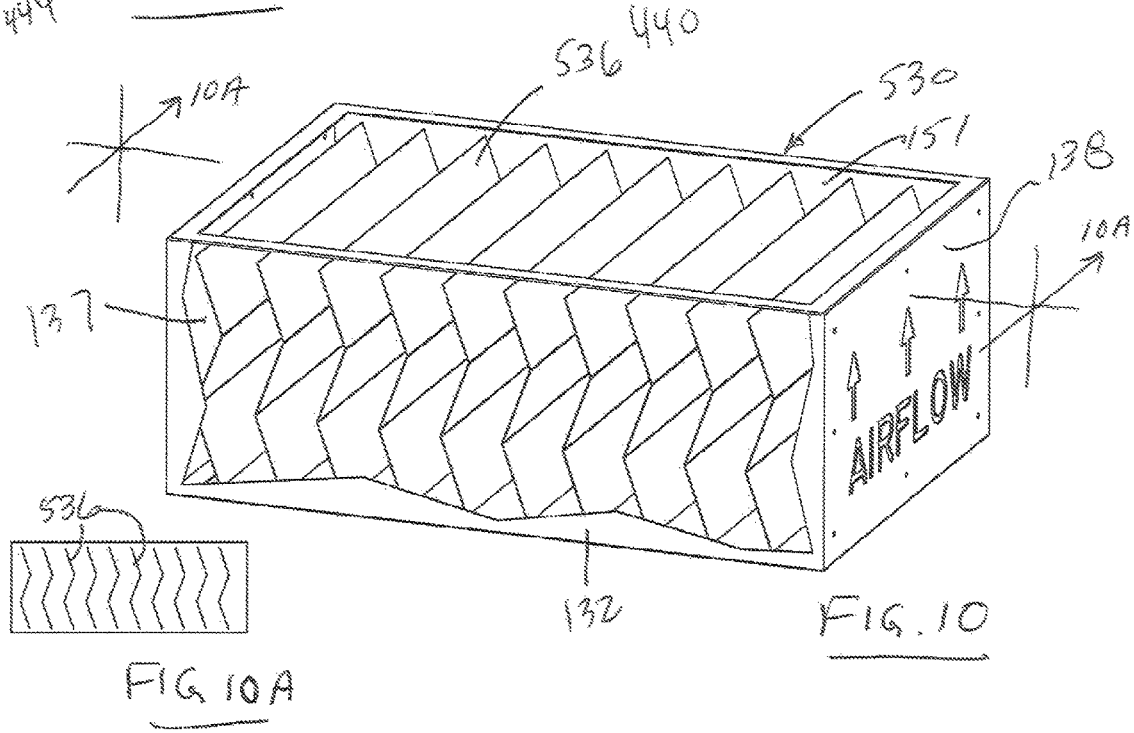

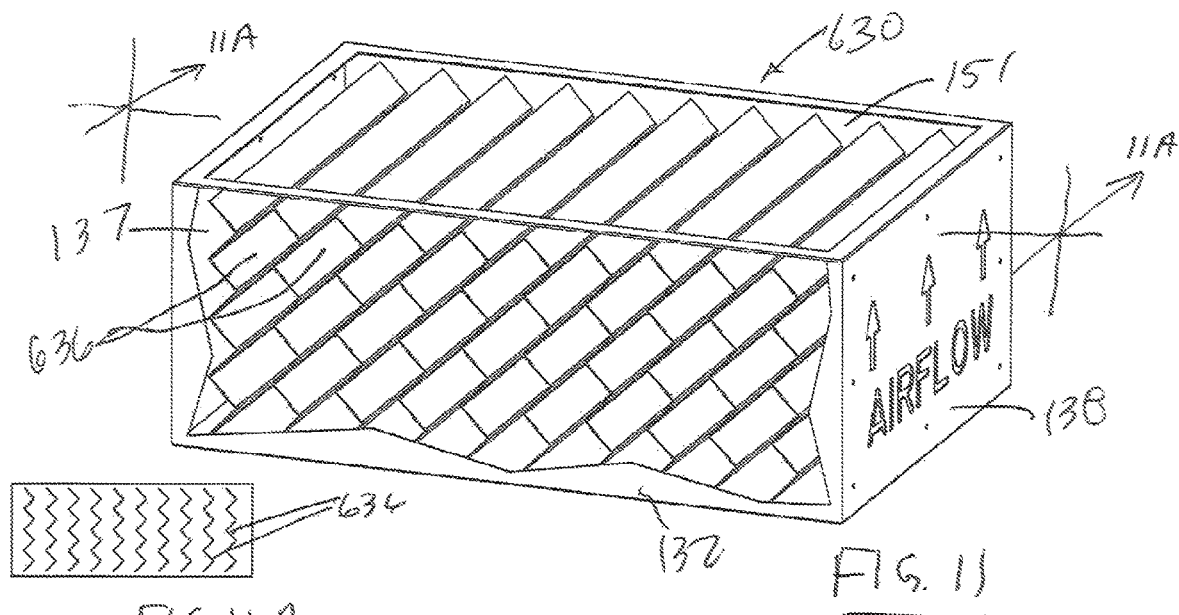
FIG. 11
FIG. 11A
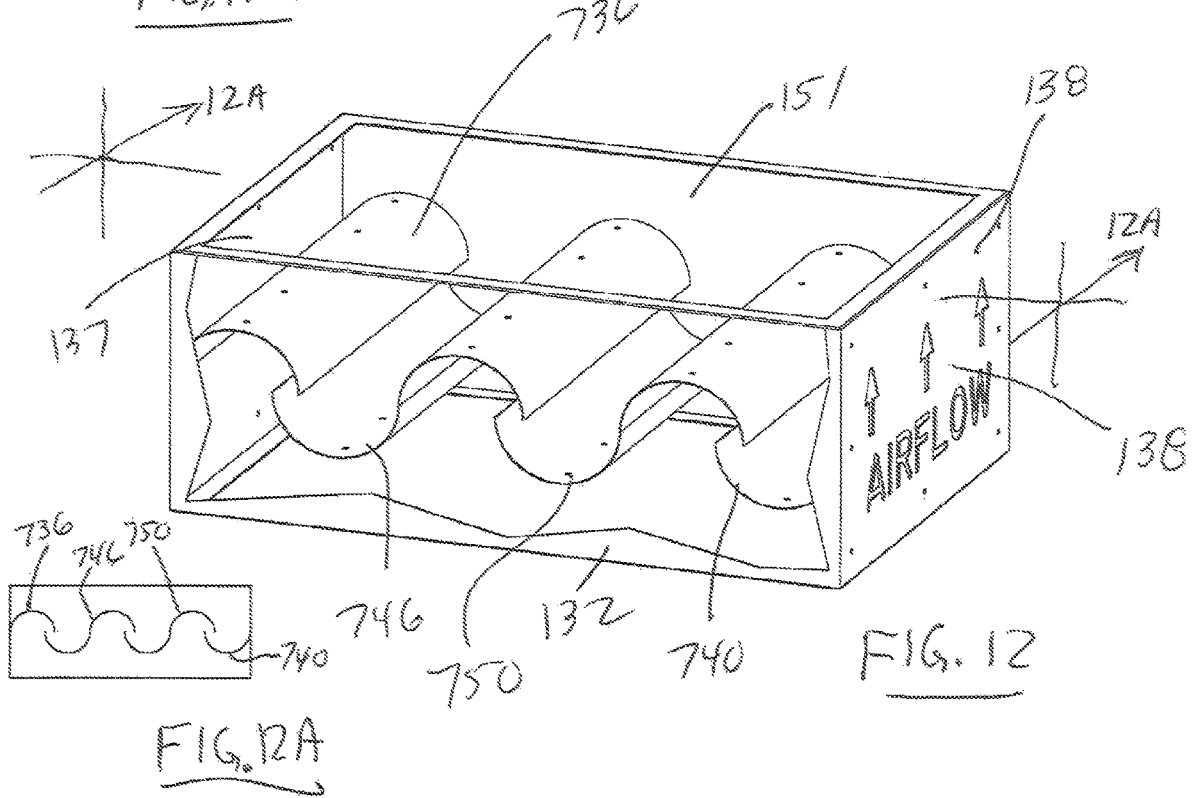
FIG. 12
FIG. 12A

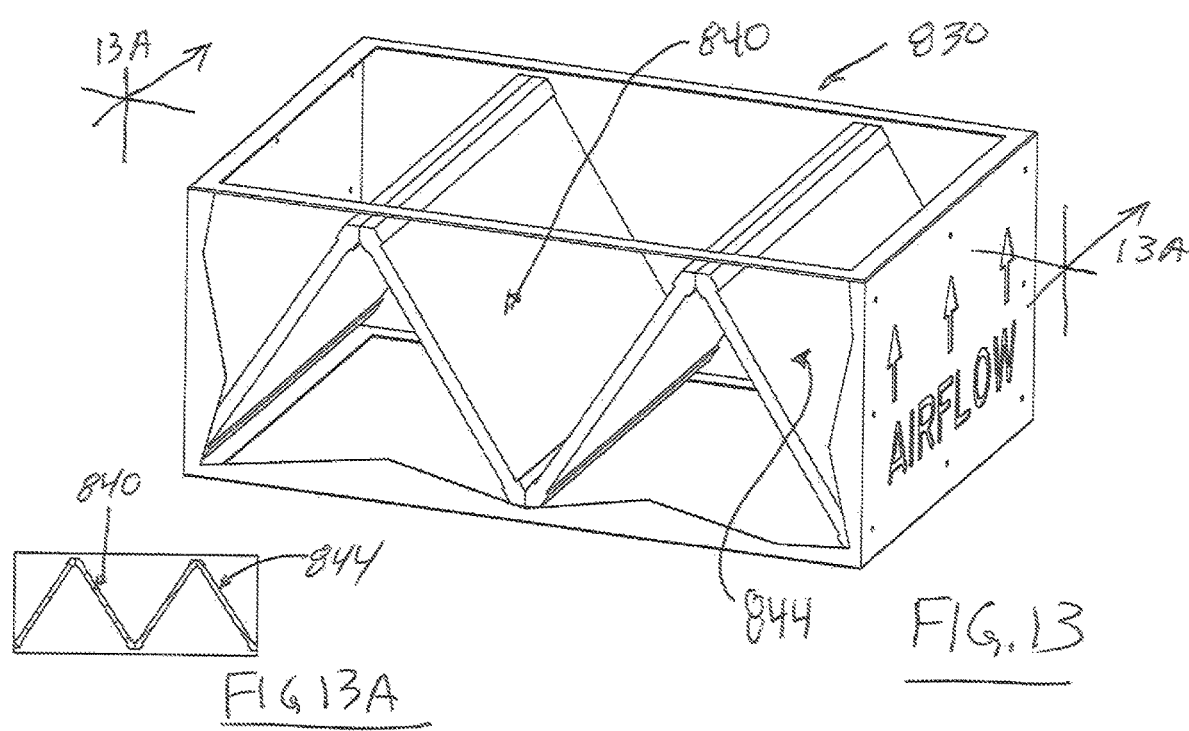

WET SCRUBBER APPARATUS

BACKGROUND

Wet scrubbing apparatus are known for removing particulates or dust from gas streams. Wet scrubbers are used to remove contaminants from gas by mixing the gas with water within a housing. The particulates within the gas are entrained in the water. The gas/water mixture flows past one or more baffles, and the particulate laden water is removed from the gas by contact with the baffles. The particulate-cleaned gas exits through a gas outlet and the particulate laden water is pumped to a treating process.

U.S. Pat. Nos. 9,388,688; 6,032,932; 4,204,847; 3,971,641; 3,795,089; 3,699,748; and 3,685,261 all disclose wet scrubbing apparatus.

The present inventor has recognized that present designs of wet scrubbers have the scrubbing baffles as permanent weld-in-place designs that are difficult to maintain and clean properly without considerable maintenance costs.

The present inventor has recognized that due to the permanence of the weld-in-place baffle design of the present systems, the efficiency and other requirements addressing loading, particle size, particle mass density is pre-determined and difficult to change.

SUMMARY

An exemplary embodiment of the present invention provides an improved design that is easier to maintain and modify for particular process conditions. The exemplary embodiment provides the ability to interchange and/or completely modify wet scrubber apparatus prior to application or after application in the field. This flexibility offers considerable advantage to adjust a wet scrubber's efficiency and effectiveness after an initial design of the housing or later in the field. Furthermore, the wet scrubber can be modified to be used for different applications.

An exemplary embodiment wet scrubber includes a first compartment having a first gas inlet and a fluid reservoir below the first gas inlet, the first gas inlet and fluid reservoir arranged such that gas entering through the first gas inlet entrains fluid held in the fluid reservoir, a first gas outlet, and a first side opening. A first scrubbing module is sized and configured to slide into the first side opening. The first scrubbing module has a first module inlet in communication with the first gas inlet and a first module outlet in communication with the first gas outlet. The first scrubbing module has first gas flow-directing baffles that assist in removing fluid and entrained particles from the gas.

The wet scrubber can include a second compartment having a second gas inlet, a second gas outlet, and a second side opening. A de-misting module is sized and configured to slide into the second side opening. The de-misting module has a de-misting module inlet in communication with the second gas inlet and a de-misting module outlet in communication with the second gas outlet. The de-misting module has second gas flow-directing baffles that assist in removing fluid from the gas.

Further compartments that house scrubbing modules can be located between the first compartment and the second compartment.

The exemplary embodiment wet scrubber has a housing with access doors and guides that allow for the installation of self-contained baffle modules. Selected baffle modules can to be inserted, exchanged, removed or left blank (no baffles) within the wet scrubber housing, depending on the desired process. The wet scrubber allows for variable performance and feature-enhancing for a target efficiency and effectiveness.

The exemplary embodiment wet scrubber can incorporate a pump and pipe manifold "fluidizer" design that can spray water or fluid up onto the varying modules during operation of the wet scrubber to keep collected material off the different scrub baffles. Alternately, water can be sprayed throughout the modules onto the baffles during operation, or when the scrubber is offline, isolated from the gas to be scrubbed, during a cleaning operation. This water or fluid can come from an outside source or can be piped and valved to recirculate existing scrub water or fluid.

The exemplary embodiment wet scrubber pump and manifold system allows for the self-cleaning of the modules during shut down periods.

Numerous other advantages and features of the present invention will be become readily apparent from the following detailed description of the invention and the embodiments thereof, and from the accompanying drawings.

BRIEF DESCRIPTION OF THE DRAWINGS

FIG. 4 is a perspective view of a first type of wet scrubber module;

FIG. 4A is a sectional view taken generally along the line 4A-4A of FIG. 4;

FIG. 5 is a perspective view of a second type of wet scrubber module;

FIG. 5A is a sectional view taken generally along the line 5A-5A of FIG. 5;

FIG. 6 is a perspective view of a third type of wet scrubber module;

FIG. 6A is a sectional view taken generally along the line 6A-6A of FIG. 6;

FIG. 7 is a perspective view of a fourth type of wet scrubber module;

FIG. 7A is a sectional view taken generally along the line 7A-7A of FIG. 7;

FIG. 8 is a perspective view of a fifth type of wet scrubber module;

FIG. 8A is a sectional view taken generally along the line 8A-8A of FIG. 8;

FIG. 9 is a perspective view of a sixth type of wet scrubber module;

FIG. 9A is a sectional view taken generally along the line 9A-9A of FIG. 9;

FIG. 10 is a perspective view of a seventh type of wet scrubber module;

FIG. 10A is a sectional view taken generally along the line 10A-10A of FIG. 10;

FIG. 11 is a perspective view of a eighth type of wet scrubber module;

FIG. 11A is a sectional view taken generally along the line 11A-11A of FIG. 11;

FIG. 12 is a perspective view of a ninth type of wet scrubber module;

FIG. 12A is a sectional view taken generally along the line 12A-12A of FIG. 12;

FIG. 13 is a perspective view of a tenth type of wet scrubber module; and

FIG. 13A is a sectional view taken generally along the line 13A-13A of FIG. 13.

DETAILED DESCRIPTION

Figure 1:
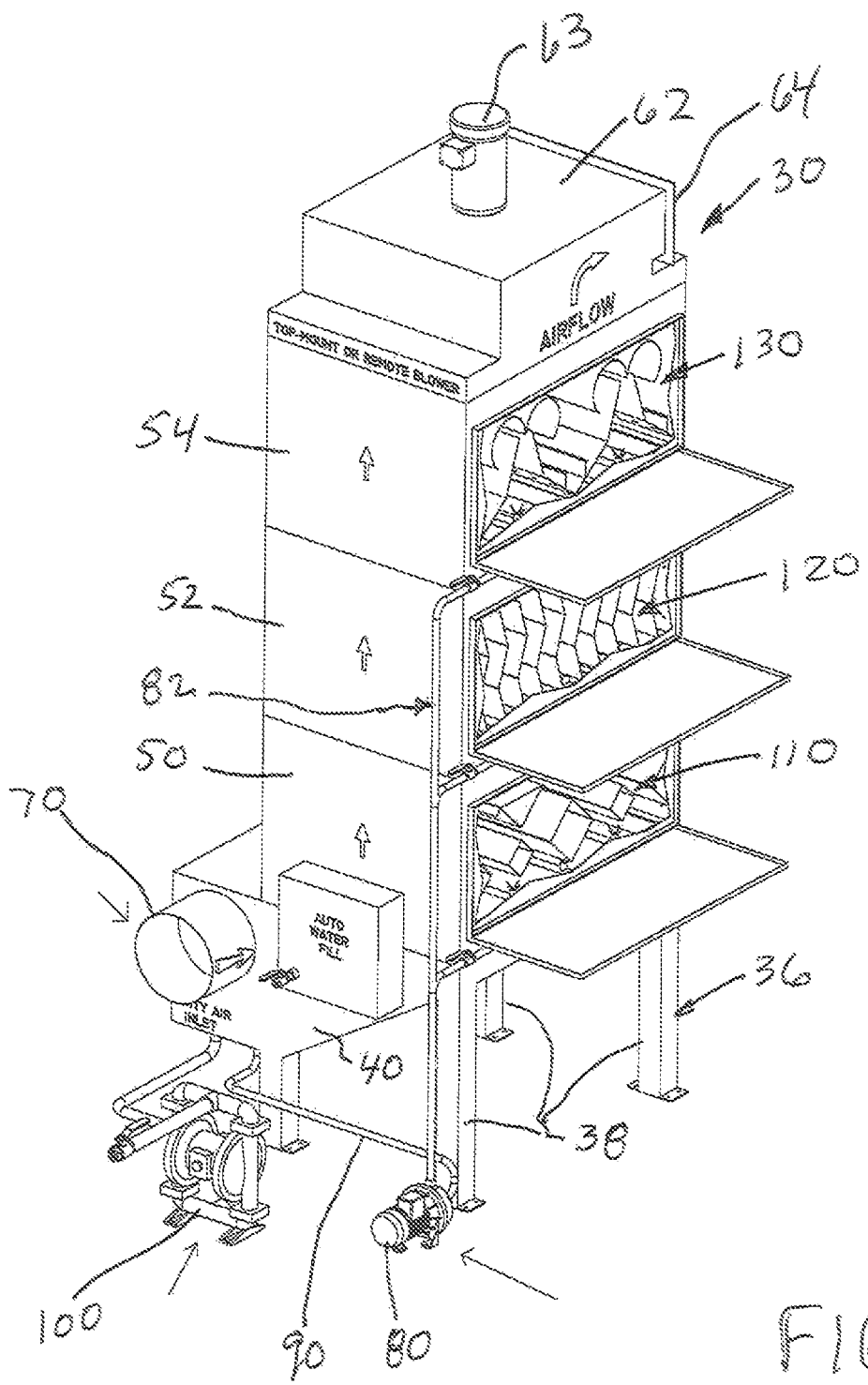
FIG. 1 is a perspective view of a first embodiment wet scrubber, shown with cabinet doors open to see installed baffle modules.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
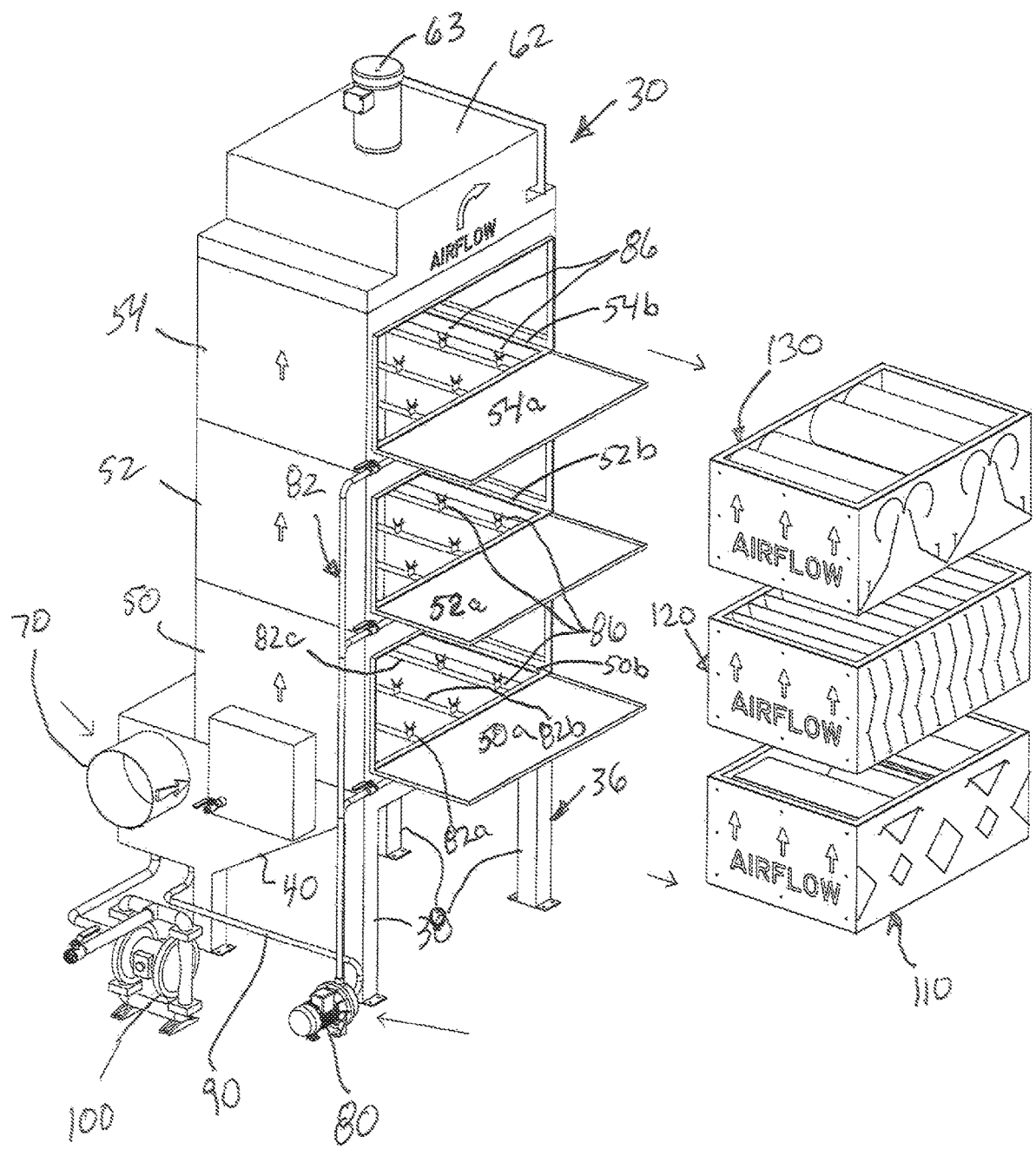
FIG. 2 is an exploded perspective view of the wet scrubber of FIG. 1, showing the baffle modules removed from inside the wet scrubber cabinet.

FIGS. 1 and 2 illustrate a wet scrubber 30 according to an exemplary embodiment of the invention. The scrubber 30 includes a frame 36 that includes a plurality of legs 38 arranged in a rectangular pattern. The frame supports a basin 40 and cabinets 50, 52, 54 and a plenum 62. The first stage cabinet 50 has an open bottom that is open into an open top of the basin 40. The second stage cabinet 52 has an open bottom that is open to an open top of the cabinet 50. The third stage cabinet 54 has an open bottom that is open to an open top of the cabinet 52. The plenum 62 has an open bottom that is open to an open top of the cabinet 54. The plenum houses a fan (not shown) driven by a motor 63 and includes an outlet 64. A gas inlet duct 70 is open into the basin 40.

A first pump 80 delivers water or other fluid through a piping network 82 to spray nozzles 86 arranged in the bottom face of the cabinets 50, 52, 54. The first pump 80 takes suction from an inlet pipe 90 connected to the basin 40. The first pump 80 can be operated as a module self-cleaning pump when the scrubber is taken offline, or for fluidizing the modules during online operation, particularly the modules above the first stage. A second pump 100 receives water from a bottom of the basin 40 and pumps the water to a water treating system (not shown). The second pump 100 is a bleed off or total pump out diaphragm pump causing effluent to be pumped to a sewer or waste treatment equipment.

Within the first stage cabinet 50, a first scrubbing module 110 is received. Within the second stage cabinet 52 a second scrubbing module 120 is received. Within the third stage cabinet 54 a third scrubbing module 130 is received. Each module 110, 120, 130 comprises a rectangular box with open top and bottom faces. Within the box, baffle elements are mounted to span between front and back walls of the box. Gas passes from the open bottom face, through the box and out of the open top face of the box by passing around and/or through the baffles. The modules 110, 120, 130 are shown with the front walls broken away so that the baffles can be seen. The modules are constructed of sheet metal, including the boxes and the baffles therein. The sheet metal can be steel, aluminum or other appropriate sheet metal for the process conditions. Other materials of construction are also encompassed by the invention. The boxes and baffles can be assembled and connected together by welding or other joining means.

FIG. 2 illustrates the modules pulled out of the cabinets. Each cabinet has a bottom hinged access door 50a, 52a, 54a that is pivoted open to install/remove the respective module 110, 120, 130. A peripheral, rectangular support surface 50b, 52b, 54b is arranged inside each respective cabinet to support a respective module that is slid onto the respective support surface. In the illustrated embodiment, the module 130 comprises a mist-removing baffle. Within each cabinet is arranged parallel fluid delivery pipes 82a, 82b, 82c delivering water or other fluid to the plural, spaced-apart fluid-spraying nozzles 86. The nozzles 86 spray water or other fluid throughout the module onto and around the baffles.

The modules, especially above the first row, have the pumped recirculating spray headers 82a, 82b, 82c and nozzles 86 to induce water or other fluid into these modules during operation with the blower online, drawing contaminated air through the wet scrubber. This provides water or fluid presence in these modules, creating the "scrub" that is similar in the lower, first stage modules.

In addition, these banks of spray headers 82a, 82b, 82c and nozzles 86 allow for the offline, self-cleaning of the modules in place. This could be accomplished with a damper shut off of the main contaminated air inlet and an opening of a comparable cubic feet per minute bleed-in of clean air. With the main blower now turned on and the recirculating pumped spray headers valved according to which modules are desired to be cleaned, the sprayed water or other fluid from the nozzles washes down the baffles within the modules.

Figure 3:
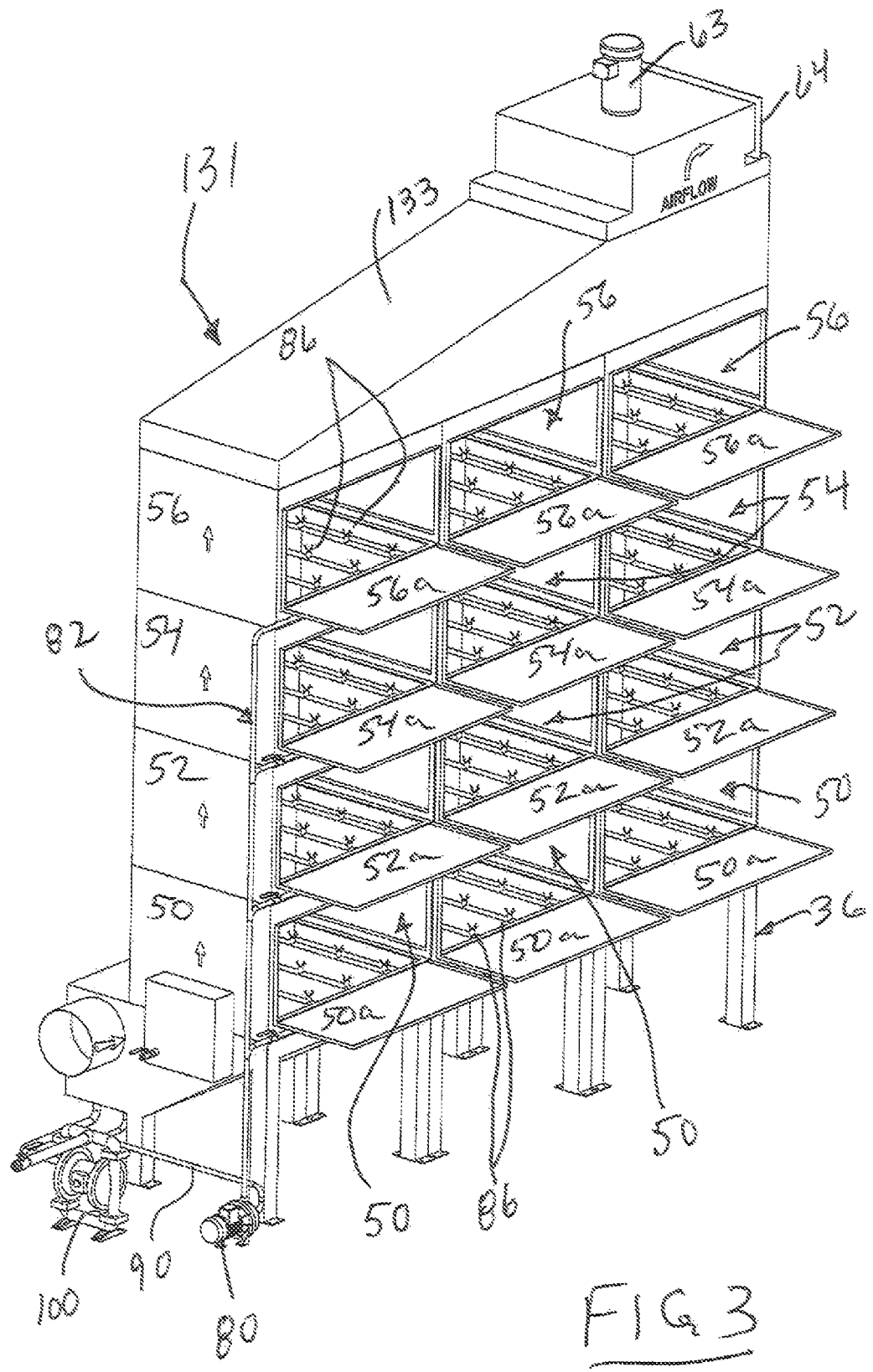
FIG. 3 is a perspective view of an alternate wet scrubber of FIG. 1 with baffle modules removed.

FIG. 3 illustrates an alternate wet scrubber 131 which includes two additional columns of compartments 50, 52, 54 which deliver gas upward into a common plenum 102, including a further row of compartments 56, having doors 56a. Each compartment 50, 52, 54, 56 include spray nozzles 86 as previously described.

FIG. 3 illustrates another benefit of the present modular design for a wet scrubber. This scrubber shown in FIG. 3 has three columns of four rows of cabinets 50, 52, 54, 56. Other column and row arrangements can be provided depending on the condition of the process gas to be cleaned, the flow rate of the process gas to be cleaned and the physical space available for the scrubber. A manufacturer can stock cabinets 50, 52, 54, 56, either individually or by columns of multiple cabinets or by rows of multiple cabinets and these cabinets, or cabinet columns or cabinet rows can be bolted together in selected combinations to meet process requirement.

FIGS. 4 and 4A illustrate the module 110. It is a primary scrub module for heavy loadings. This module is advantageously used in a first stage, the lowest stage right above the water in the basin 40. A front wall 132 is partially broken away to reveal the profile of the baffles. The baffles include upper triangular cross section baffles 134 having lateral deflectors 136, and side triangular cross section baffles 140 extending inward from opposite end walls 137, 138 below the baffles 134, and two diamond cross section baffles 146 arranged below the upper triangular cross section baffles 134, and a larger diamond cross section baffle 150 arranged below and between the baffles 134. The baffles extend between, and are connected to, the front wall 132 and the rear wall 151.

FIGS. 5 and 5A show an alternate module 160 to the module 110 having the baffles 140 and 150 but lacking the baffles 134, 146. This module is for medium-heavy loadings. It can be used in the first, second or any other scrub stage, depending on the application. The baffles 134 are replaced by flat plate baffles 166 having oblique, lateral deflectors 168. The baffles extend between, and are connected to, the front wall 132 and the rear wall 151.

FIGS. 6 and 6A show the module 130. This module is used in the upper-most cabinet stage for applications with light mass-density particulate. The module may be nearly self-cleaning on most applications. This module includes a left angular channel baffle 180 and a right angular channel baffle 186. Above the left angular channel baffle 180 is left double semi-cylindrical baffle 190. Above the right angular channel baffle 186 is a right double semi-cylindrical baffle 196. Because the left side baffles 180, 190 are identical to the right side baffles 186, 196, only the left side will be described in detail.

The left side baffle 180 is mirror image identical across a vertical plane extending between the front and back walls 132, 151 so only a left of this baffle will be described. A first panel 180*a* is at a shallow angle and a second panel 180*b* is at a steep angle. The facing panels 180*a*, 180*a* and 180*b*, 180*b* across the vertical plane are spaced apart to provide a vertical air passage therebetween.

The double cylindrical baffle 190 is mirror image identical across the vertical plane so only the left side need be described. The left side includes a semi-cylinder 191 that has an edge 192 between the facing panels 180*b*, 180*b* of the left side baffle 180. Some air passing between the baffles 180*b*, 180*b* enters the semi-cylinder 191 where it follows a semi-circular path and is deflected downward before being deflected upward outside the cylinder 191. The moving gas first strikes the baffle 180*a* and directed into the space between the faces of panels 180*b*, 180*b* where it is guided around an inside of the cylinder 191. The water tends to separate from the gas by first impinging on the baffle panel 180*a* and then by centrifugal action in the cylinder 191. A vertical baffle 193 collects water and directs the water to a front or back of the baffle panel 180*a* to drain down through the compartments.

FIGS. 7 and 7A show an alternate module 230. This module is for medium-heavy loadings. It can be used in the first, second or any other scrub stage, depending on the application. This module includes a left angular channel baffle 280, a center channel baffle 284, and a right angular channel baffle 286. Above the left angular channel baffle 280 is a left flat plate baffle 166 as previously described. Above the center angular channel baffle 284 is a center flat plate baffle 166 as previously described. Above the right angular channel baffle 286 is a right flat plate baffle 166 as previously described. Because the left side baffles 280, 166 are identical to the center baffles 284, 166, and the right side baffles 286, 166, only the left side will be described in detail.

The left side baffle 280 is mirror image identical across a vertical plane extending between the front and back walls 132, 151 so only a left side of this baffle 280 will be described. A first panel 280*a* is at a steep oblique angle. The facing first panels 280*a*, 280*a* are spaced apart across the vertical plane to provide a vertical air passage therebetween. Air passing between the baffles 280*a* is deflected downwardly by the baffle 166 before being deflected upward outside the baffle 166. The water tends to separate from the gas by first impinging on the baffle panels 280*a* and then by impinging on the baffle 166. A corner between adjacent baffle panel 280*a* forms a trough 290 to collect water and direct it to a front or back of the baffle panel to drain down through the compartments.

FIGS. 8 and 8A show an alternate module 330. This module is for medium-heavy loadings. It can be used in the first, second or any other scrub stage, depending on the application. This module includes a left angular baffle 312 and a right angular baffle 316 and a center V-shaped baffle 320. Because the left side baffle 312 is identical to the right side baffle 316, only the left side baffle 312 will be described in detail. The left side angular baffle 312 extends from the end wall 137 at an upward oblique angle and has a 90 degree down turned lip 326. The right side angular baffle 316 is mirror image identical across a vertical center plane extending between the front and back walls 132, 151 of the compartment.

The V-shaped baffle 320 includes opposite 90 degree down turned deflectors 330, 332. Between and below the left angular baffle 312 and the center baffle 320 is a left complex baffle 336 and between and below the right angular baffle 316 and the center baffle 320 is a right complex baffle 338. Since the complex baffles 336, 338 are identical, only the left complex baffle 336 will be described. This baffle 336 includes a V-shaped sidewall 346 with a diamond shaped housing 350 within the V-shaped sidewall. In operation, gas passes over the V-shaped sidewall, impinges on the angular baffle 312 and is directed down by the deflector 326 onto the diamond shaped body 350. The water is collected in the trough 356 formed between the V-shaped baffle and the diamond shaped body.

FIGS. 9 and 9A show an alternate module 430. This module is for medium-heavy loadings. It can be used in the first, second or any other scrub stage, depending on the application. This module includes a left semi-cylindrical baffle 436 curved down and a right angular channel baffle 440 curved down. A double semi-cylindrical baffle 444 is arranged between the baffles 436, 440. A left complex baffle 450 is arranged between the baffles 436, 444. A right complex baffle 454 is arranged between the baffles 444 and 440.

Since the baffles 450 and 454 are identical, only the left baffle 450 will be described. The baffle includes a V-shaped bottom portion 460 below a double semi-cylindrical baffle 462. A vertical wall 464 connects between the semi-cylindrical of the baffle 462 and is connected to a V-shaped top portion 470.

Gas flowing up through the box passes by the lower V-shaped bottom portion 460 over a lower surface of the baffle 462, under and around the baffle 436 or 444, over and around a top surface of the baffle 462, up and along the vertical wall 464 and over a top surface of the baffle 436 or 444 and under the V-shaped top portion 470, and out of the box.

FIGS. 10 and 10A show an alternate module 530. This module is for large particulate and light loadings. It can be used in the second or third cabinet stage, depending on the application. It can also be used as a final mist eliminator. The module 530 includes multiple baffles 536 arranged space-a part in parallel, from the end wall 137 to the wall 138. Each baffle 536 has a three panel zig-zag shape. Gas passing between the baffles impinges against the panels of the baffles and the water is removed.

FIGS. 11 and 11A show an alternate module 630. This module is for small particulate and higher efficiencies. It can be used in the second or third cabinet stage, depending on the application. It can also be used as a final mist eliminator. The module 630 includes multiple baffles 636 arranged in parallel and spaced apart from the end wall 137 to the wall 138. Each baffle 536 has a eight panel zig-zag shape. Gas passing between the baffles impinges against the panels of the baffles and the water is removed.

FIGS. 12 and 12A show an alternate module 730. This module is used in the final upper-most cabinet stage before the plenum, and is used for last-stage mist elimination. This module includes a left semi-cylindrical baffle 736 curved down and a right semi-cylindrical baffle 740 curved up. Between the baffles are arranged a left side S-shaped baffle 746 and a right side S-shaped baffle 750. The baffles 746, 750 are arranged to vertically overlap each other and with the left baffle 736 and the right baffle 740. On a far left side, gas flowing up through the box passes under and around the inside of the baffle 736 and directed down and into and around the inside of the baffle 746 and upward out of baffles from left to right are repeated in operation, not mirror image arranged.

FIGS. 13 and 13A show an alternate module 830. This module is used in the final upper-most cabinet stage. It uses replaceable mist pads, intended for heavy mass-density particulate. This module includes a left inverted V-shaped baffle 840 and a right inverted V-shaped baffle 844. The baffles are composed of mist elimination pads to allow gas to pass therethrough but which blocks liquid droplets or mist.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A wet scrubber, comprising:
a frame defining a first compartment and a second compartment, each of the first and second compartments having surrounding sidewalls and a door;
the first compartment having a first gas inlet and a fluid reservoir below the first gas inlet, the first gas inlet and fluid reservoir arranged such that gas entering through the first gas inlet entrains fluid held in the fluid reservoir, a first gas outlet, and a first side opening closed by the door of the first compartment; and
a first scrubbing module sized and configured to slide into the first side opening, to be contained in the first compartment, the first scrubbing module having a first module inlet in communication with the first gas inlet and a first module outlet in communication with the first gas outlet, said module having first gas flow-directing baffles, comprising spaced-apart plate surfaces that are impacted by fluid and entrained particles in the gas, wherein the first scrubbing module comprises a first surrounding frame and said first flow-directing baffles are fixed to the first surrounding frame, wherein all of the first flow-directing baffles are removable from the first compartment by removing the first surrounding frame; and
a second compartment having a second gas inlet, a second gas outlet, and a second side opening closed by the door of the second compartment; and
a de-misting module sized and configured to slide into the second side opening, to be contained in the second compartment, the de-misting module having a de-misting module inlet in communication with the second gas inlet and a de-misting module outlet in communication with the second gas outlet, said de-misting module having second gas flow-directing baffles comprising spaced-apart plate surfaces that are impacted by fluid entrained in the gas, wherein the de-misting module comprises a second surrounding frame and said second flow-directing baffles are fixed to the second surrounding frame, wherein all of the second flow-directing baffles are removable from the second compartment by removing the second surrounding frame;
wherein the first compartment is in series with the second compartment, the first gas outlet flow-connected to the second gas inlet.

2. The wet scrubber according to claim 1, comprising:
a third compartment having a third gas inlet, a third gas outlet, and a third side opening; and
a second scrubbing module sized and configured to slide into the third side opening, the second scrubbing module having a third module inlet in communication with the third gas inlet and a third module outlet in communication with the third gas outlet, said second scrubbing module having third gas flow-directing baffles that are impacted by fluid and entrained particles in the gas, wherein the second scrubbing module comprises a third surrounding frame and said third flow-directing baffles are fixed to the third surrounding frame, wherein all of the third flow-directing baffles are removable from the third compartment by removing the third surrounding frame; wherein
the third compartment is in series after the first compartment and before the second compartment, the third gas inlet flow-connected to the first gas outlet and the third gas outlet flow-connected to the second gas inlet.

3. The wet scrubber according to claim 1, comprising:
a plurality of nozzles connected to a pipe network, the pipe network supplying fluid under pressure to the nozzles, some of the nozzles arranged to spray a wash stream onto the first gas flow-directing baffles and some of the nozzles arranged to spray a wash stream onto the second gas flow-directing baffles.

4. The wet scrubber according to claim 1, wherein said first scrubbing module comprises at least one first elongated body that spans across a width of the first scrubbing module and comprises a diamond shaped cross section.

5. The wet scrubber according to claim 4, wherein said first scrubbing module comprises a plurality of spaced apart second elongated bodies that each span across a width of the first scrubbing module and each comprises a triangular shaped cross section, with down turned lateral deflectors, said second elongated bodies being arranged above the first elongated body.

6. The wet scrubber according to claim 4, wherein said first scrubbing module comprises a plurality of spaced apart second elongated bodies that each span across a width of the first scrubbing module and each comprises a flat plate with down turned lateral deflectors, said second elongated bodies being arranged above the first elongated body.

7. The wet scrubber according to claim 1, wherein said first scrubbing module comprises a plurality of spaced apart first elongated bodies that each span across a width of the first scrubbing module and each comprises a diamond shaped cross section.

8. The wet scrubber according to claim 1, wherein said first scrubbing module comprises at least one first elongated body that spans across a width of the first scrubbing module and comprises a triangular shaped cross section.

9. The wet scrubber according to claim 1, wherein said first scrubbing module comprises at least one first elongated body having a diamond shaped cross section that spans across a width of the first scrubbing module, and at least one second elongated body above the first elongated body and that spans across a width of the module and comprises a triangular shaped cross section.

10. The wet scrubber according to claim 1, wherein said first surrounding frame is rectangular.

11. The wet scrubber according to claim 1 wherein said first surrounding frame and the second surrounding frame are rectangular.

12. The wet scrubber according to claim 2, wherein said first surrounding frame and the second surrounding frame are rectangular.

13. The wet scrubber according to claim 2, wherein said first surrounding frame, the second surrounding frame, and the third surrounding frame are rectangular.

14. The wet scrubber according to claim 1, comprising a first door and wherein the first side opening is closed by the first door after the first module is inserted into the first compartment.

15. The wet scrubber according to claim 1, wherein the door of the first compartment is hinged to the first compartment.

16. The wet scrubber according to claim 1, wherein the door of the first compartment is hinged to the first compartment and the door of the second compartment is hinged to the second compartment.

\* \* \* \* \*